(12) United States Patent
Ernest (10) Patent No.: US 8,187,461 B2
(45) Date of Patent: May 29, 2012

(54) SYSTEM AND METHOD FOR PROCESSING AND REUSING GRAYWATER INCLUDING FOR USE IN A HOME AND GARDEN

(76) Inventor: Moshe Elazar Ernest, Jerusalem (IL)

(*) Notice: Subject to any disclaimer, the term of this patent is extended or adjusted under 35 U.S.C. 154(b) by 0 days.

(21) Appl. No.: 12/998,275

(22) PCT Filed: Oct. 11, 2009

(86) PCT No.: PCT/IL2009/000955
§ 371 (c)(1),
(2), (4) Date: Apr. 4, 2011

(87) PCT Pub. No.: WO2010/041246
PCT Pub. Date: Apr. 15, 2010

(65) Prior Publication Data
US 2011/0186507 A1 Aug. 4, 2011

(30) Foreign Application Priority Data
Oct. 7, 2008 (IL) .......................................... 194661

(51) Int. Cl.
*C02F 3/32* (2006.01)
*C02F 1/32* (2006.01)

(52) U.S. Cl. ................... 210/602; 210/748.11; 210/143; 210/170.01; 210/196; 210/259

(58) Field of Classification Search ................ 210/602, 210/615, 616, 617, 739, 741, 744, 748.1, 210/748.11, 141, 143, 170.01, 196, 252, 210/259, 263
See application file for complete search history.

(56) References Cited

U.S. PATENT DOCUMENTS

| | | | |
|---|---|---|---|
| 3,770,623 A | 11/1973 | Seidel | |
| 4,333,837 A | 6/1982 | Plósz et al. | |
| 5,106,493 A | 4/1992 | McIntosh | |
| 5,733,453 A * | 3/1998 | DeBusk | 210/602 |
| 5,897,777 A | 4/1999 | Zoeller et al. | |

(Continued)

OTHER PUBLICATIONS

Anonymous. "Design Report, Greywater Treatment Plants, Hamman and Apartment House, Attaouia, Morroco," *Sustainable Concepts Towards a Zero Overflow Municipality*, Jul. 2007, [Online] Retrieved from the Internet: URL:http://www.zer0-m.org/pilots_m.htm> [retrieved on Jan. 29, 2010, the whole document].

(Continued)

*Primary Examiner* — Fred Prince
(74) *Attorney, Agent, or Firm* — D. Peter Hochberg; Sean F. Mellino; Daniel J. Smola (57) ABSTRACT

A system and method for processing and reusing graywater. At least two vertical flow wetland units are provided, each of which comprises a container filled with at least one granular substrate and at least one species of a hygrophilous plant, and an outlet. At least one of the wetland units is set to an inactive state during a predetermined period of time such that influx of graywater to each of the inactive units is prevented, to regenerate each inactive wetland units. At least one of the wetland units is set to an active state to allow introduced graywater to be purified. Purified graywater is discharged from the outlet of each active unit to a sink. At least a portion of the purified graywater is recirculated to each active wetland units so that a portion of the purified graywater, when desired, is discharged to a domestic site for reuse.

16 Claims, 4 Drawing Sheets

U.S. PATENT DOCUMENTS

| | | | |
|---|---|---|---|
| 6,652,743 B2 * | 11/2003 | Wallace et al. | 210/170.01 |
| 8,021,551 B2 * | 9/2011 | Harrison | 210/602 |
| 2008/0175668 A1 | 7/2008 | Haese | |

OTHER PUBLICATIONS

Gross et al. "Removal of chemical and microbiological contaminants From domestic greywater using a recycled vertical flow bioreactor (RVFB)," *Ecological Engineering*, vol. 31, No. 2, Aug. 24, 2007, pp. 107-147.

Gross et al. "Recycled vertical flow constructed wetland (RVFCW)—a novel method of recycling greywater for irrigation in small communities and households," *Chemosphere*, Vo. 66, No. 5, Nov. 25, 2006, pp. 916-923, Pergamon Press, Oxford, GB.

Platzer, C. Mauch, K. "Soil clogging in vertical flow reed beds—mechanisms, parameters, consequences and . . . solutions?" *Water Science and Technology*, vol. 35, No. 5, 1997, pp. 175-181.

Rogers, P.; "Facing the Freshwater Crisis;" *Scientific American*, Aug. 2008, vol. 299, pp. 28-35.

Amit Gross, et al.; "Greywater Treatment and Reclamation for Garden Irrigation by a Recycled Vertical Flow Constructed Wetland;" *Water and Irrigation*, Aug. 2003, No. 442, pp. 14-21 (in Hebrew with English translation).

* cited by examiner

SYSTEM AND METHOD FOR PROCESSING AND REUSING GRAYWATER INCLUDING FOR USE IN A HOME AND GARDEN

CROSS-REFERENCE TO RELATED APPLICATIONS

This application is a National Stage application of International Application No. PCT/IL2009/000955, filed on Oct. 11, 2009, which claims priority of Israel Patent Application Serial Number 194661, filed on Oct. 7, 2008, both of which are incorporated herein by reference in their entireties.

BACKGROUND OF THE INVENTION

1. Field of the Invention

The present invention relates to a method and system for reclamation and purification of a substantial part of household waste water. Particularly, a novel system and method for reusing graywater are provided, using the principles of vertical flow constructed wetlands.

2. Description of the Prior Art

As the standard of living rises, and as the world population increases, the demand for freshwater soars. The available sources of fresh water are quite limited around the world, and in many cases they are distributed unevenly in space or time. Environmental concerns and a steep increase of water prices motivate reusing as much household wastewater as possible [Rogers P.: Scientific American 299, August 2008, 28-35].

Current methods of recycling non-potable water need expensive and complex equipment to be installed and maintained, and require large amounts of energy. Cheap and technologically simple solutions to the problems of reusing household water, however, could substantially alleviate periodic or chronic water shortage in many areas, as well as affording significant saving of freshwater at both national and global levels. In recent years, graywater has become a target for saving in households. Graywater is any wastewater used in the home, except from toilets, including bathwater and the discharge following washing clothes and dishes, comprising 50-80% of the total household consumption; various attempts have been made to use graywater, instead of disposing it in sewage, for irrigating gardens or for other uses not requiring potable water.

U.S. Pat. No. 5,106,493 describes a system for processing and reusing graywater; the system comprises filtering means and chlorinating means for water purification, at least two pumps, and electromechanical control means. Additional means and modifications for manipulating graywater have since been described, including special tubing, filters, chemicals, and software. A part of wastewater can, thus, be retrieved, and more or less conveniently utilized, particularly when the house is provided with parallel graywater lines, such as described in US 2008/0175668. However, the complex and expensive plumbing installations and changes discourage many clients. Despite the importance of water saving systems, monthly savings may seem rather modest, and many people do not like to invest too much in the future, notwithstanding people in poorer areas.

A Recycled Vertical Flow Constructed Wetland (RVFCW) comprising a three-layer bed with planted organic soil overlying a filter consisting of an upper layer of tuff or plastic media and a lower layer of limestone pebbles, and a reservoir located below the bed has been disclosed. [A. Gross et al, "Recycled Vertical Flow Constructed Wetland (RVFCW)—A Novel Method to Recycle Graywater for Landscape Irrigation in Small Communities and Households", Chemosphere 66, 2007, 916-923]

The direct flow of raw graywater into the root zone of the plant provided with the organic soil prevents bad odors and mosquitoes, and reduces the possibility of human contact and spread of disease. The graywater seeps through the porous filter towards the reservoir, further preventing development of odors and enhancing organic matter degradation and nitrification. The lime pebbles buffer the acidity produced by the nitrification and biodegradation. The water is then aerated as it falls through the air towards the reservoir. The water from the reservoir is recycled back to the upper filter, in order to dilute an additional amount of graywater and to reduce the risk of organic overload or other damage to the filter such as excess chlorination. Since water passes through the filter more than once, the required surface area in order to attain a specific water quality can be reduced. The RVFCW was found to remove virtually all the suspended solids, biological oxygen demand (BOD) and about 80% of the chemical oxygen demand (COD) after 8 hours. Although faecal coliforms dropped by 3-4 orders of magnitude from their initial concentration after 8 hours, this level was not enough to meet current regulations for unlimited irrigation.

This RVFCW is incapable of recycling graywater for extended periods of time since the filter becomes clogged with slime and sludge after a short period of time of 7-14 days. The graywater is therefore not transmitted through the filter, pooling above the planted organic soil layer, spilling outwardly from the bed without being purified. Thus this RVFCW is not suitable for providing a reliable and on-going source of recycled water for household use.

Another disadvantage associated with this RVFCW is that the graywater, as described in a similar article in Hebrew [Water and Irrigation, August, 2003, No. 442, pp. 14-21], is introduced to the planted organic soil between peat and pebble layers by means of perforated pipes. As the roots of the plant continue to grow, the perforations of the pipes become blocked with roots, thus preventing the discharge of the graywater to the filter and rendering the RVFCW useless in purifying graywater on a continuous basis.

Another disadvantage associated with this RVFCW is that the graywater is collected in a settling tank for a period of time before being introduced to the RVFCW. The graywater develops objectionable odors while remaining in the settling tank, in addition to experiencing a rapid increase in bacteria, some of which may be pathogenic. In addition, the settling tank requires periodic cleaning and disposal of the settled sludge.

SUMMARY OF THE PRESENT INVENTION

It is an object of the present invention to provide a novel system for effective, efficient, and continuous graywater processing so as to serve as a safe and reliable source of recycled and purified water for household use.

It is an additional object of the present invention to provide a graywater processing system which recycles a substantial portion of household wastewater but which is not excessively expensive or technically demanding.

It is another object of the present invention to optimize the consumption of household water, including for use in the garden, by a single environmentally friendly system. A high level of neighborhood and private home architecture requires green areas and gardens, but watering regulations and high water costs may nowadays severely limit gardening initiatives. Graywater can help. It is, therefore, another object of this invention to provide a system and method for reclamation and purification of graywater, and to provide water for garden irrigation, without posing a health risk.

It is a further object of the invention to provide a method for reusing treated graywater for flushing toilets, without posing health risks.

It is still another object of the present invention to provide a method of reclaiming and purifying graywater comprising a system based on the principles of macrophytic vertical flow constructed wetlands.

It is a further object of the present invention to provide a method of utilizing a home garden, including non-water plants, to purify graywater.

It is also a further object of the present invention to provide a method for watering a home garden, using treated and recycled irrigation graywater repeatedly, without any loss of water to soil outside of garden, thus achieving maximal watering efficiency without affecting in any way the soil environment outside of the garden.

It is a still further object of this invention to provide a system for reclamation of graywater with the simplest technical means.

Other objects and advantages of present invention will appear as description proceeds.

The present invention is a method for processing and reusing graywater, comprising the steps of: (a) providing at least two vertical flow wetland units, each of which comprising a container filled with at least one granular substrate and at least one species of a hygrophilous plant, and an outlet means; (b) setting at least one of said wetland units to an inactive state during a predetermined period of time such that influx of graywater to each of said inactive units is prevented, whereby to regenerate each of said inactive wetland units; (c) setting at least one of said wetland units to an active state whereby graywater introduced to each of said active wetland units is purified; (d) delivering graywater from a source of graywater to each of said active wetland units while purified graywater is discharged from the corresponding outlet means to a sink; (e) recirculating at least a portion of said purified graywater to each of said active wetland units; and (f) discharging, when desired, a portion of said purified graywater to a domestic site for reuse.

A wetland unit, for example one having an upper layer comprising a mixture of peat, sand and soil, is adapted to purify graywater by stimulating graywater nitrification and biodegradation. If not regenerated in accordance with the present invention, a wetland unit is liable to cease to be functional after a relatively short period of time due to the development of slime and sludge which prevent the transmission of graywater through the granular substrate. As referred to herein, a wetland unit set to the inactive state is "regenerated" when the causes of slime and sludge development are eliminated, such as by drying each layer of the wetland unit. By being cyclically switching from an active to an inactive state, a wetland unit provides a safe and reliable source of purified graywater for household use for long periods of time while helping to dramatically reduce household water consumption.

The method preferably further comprises the steps of switching the state of at least one of the inactive wetland units to an active state following the predetermined period of time and/or switching the state of at least one of the active wetland units to an inactive state during the predetermined period of time, and repeating steps d-f.

In one aspect, the step of setting at least one of said wetland unit to an inactive state is performed by isolating a selected wetland units from a first conduit means extending from the graywater source to each of the wetland units and from a second conduit means extending from the sink to each of the wetland units.

In one aspect, the selected wetland unit is isolated from the first and second conduit means by means of a controller and control valves in communication with said controller. The controller commands to switch the selected wetland unit from an inactive state to an active state.

The present invention is also directed to a system for processing and reusing graywater, comprising (a) a source of graywater; (b) at least two vertical flow wetland units, each of which comprising a container filled with at least one granular substrate and at least one species of a hygrophilous plant, and an outlet means; (c) first conduit means extending from said graywater source to each of said at least two wetland units; (d) a sink for receiving purified graywater discharged from the outlet means of each of said at least two wetland units; (e) second conduit means extending from said sink to each of said at least two wetland units; (f) a recirculation pump for delivering purified graywater through said second conduit means; (g) isolating means, for isolating a first wetland unit from said first and second conduit means while allowing the graywater and purified graywater to be introduced into a second wetland unit after flowing through said first and second conduit means, respectively, and for subsequently isolating said second wetland unit from said first and second conduit means after a predetermined period of time while allowing the graywater and purified graywater to be introduced into one of said at least two wetland units after flowing through said first and second conduit means; and (h) an interface unit, through which the purified graywater is discharged to a domestic site for reuse.

In one embodiment, the domestic site is a toilet tank. The interface unit comprises a discharge line extending to the toilet tank through which purified graywater flows and a discharge pump operatively associated with said discharge line for delivering purified graywater to the toilet tank. Thus domestic consumption of potable water is significantly reduced with respect to prior art systems.

In one aspect, the discharge line extends from a supplementary sink to the toilet tank, said supplementary sink receiving purified graywater from a supplementary wetland unit and from a diverting line extending from the second conduit means and downstream from the recirculation pump.

In one aspect, an additional line extends from the supplementary sink to the supplementary wetland unit and an additional pump delivers purified graywater from the supplementary sink to the supplementary wetland unit.

In one aspect, the additional pump, as well as the recirculation pump, continuously operates.

In another embodiment, the domestic site is a garden. The interface unit comprises a discharge line extending to the garden through which purified graywater flows and a discharge pump operatively associated with said discharge line for delivering purified graywater to the entire garden via sprinklers or drip irrigation system.

In one aspect, the interface unit comprises a hose and nozzle for manually discharging the purified graywater to the garden.

In one aspect, the interface unit comprises a pump for automatically discharging the purified graywater to the garden when the height of purified graywater in the sink is greater than a predetermined threshold.

In one aspect, the system further comprises an entire garden, or portions thereof, when isolated from the surroundings, serving as one or more additional wetland units. Isolated garden wetland units provide the following advantages: (1)

additional purification of irrigation graywater, (2) prevention of ecological damage resulting from the use of graywater, (3) increased irrigation efficiency as no water is lost to areas outside the garden, and (4) compliance with local or state regulations regarding graywater usage.

DETAILED DESCRIPTION OF THE PRESENT INVENTION

It has now been found, in a model family house, that a simple system of graywater reclamation and purification has worked surprisingly smoothly and efficiently during a long term experimental run, when employing at least two vertical flow constructed macrophytic wetland units built in a graywater stream circuit. The above system provided enough recycled water, without any unpleasant odor, for flushing toilets, as well as for irrigating garden, for a relatively large household, for example a household of seven to nine persons.

A constructed wetland unit generally comprises granular material, including soil, sand, peat, tuff, and gravel, and may be arranged in a plurality of layers, for example, layers of finely crushed soil and tuff, whether crude tuff having grains of 5-10 cm or fine tuff having grains of 0.5-1 cm. The layers are filled within a container to a height of from 50 to 100 cm, and the container has closed or sealed walls, to prevent contamination of the surrounding soil.

The macrophytes are generally hygrophilous plants, such as common reed (*Phragmites australis*), bulrushes (*Scirpus* spp.), rushes (*Juncus* spp.), cattails (*Typha* spp.), reed canarygrass (*Phalaris arundinacea*), sweet mannagrass (*Glyceria maxima*), alligator weed (*Alternanthera philoxeroides*), Canna lilies (*Canna* spp.), sedges (*Carex* app), coontail (*Ceratophyllum* spp.), sawgrass (*Cladium jamaicense*), wild taro (*Colocasia esculenta*), sedges (*Cyperus* spp.), spikerushes (*Eleocharis* spp.), waterweed (*Elodea* spp.), mannagrass (*Glyceria* spp.), watergrass (*Hydrocloa caroliniensis*), iris or blue flag iris (*Iris* spp.), duckweed (*Lemna* spp.), water primroses (*Ludwigia* spp.), maidencane (*Panicum hemitomon*), torpedo grass (*Panicum repens*), spoon flowers (*Peltandra* spp.), smartweeds (*Polygonum* spp.), pickerelweeds (*Pontederia* spp.), beak-rush (*Rhynchospora* spp.), arrowheads (*Sagittaria* spp.), Lizard's-tail (*Saururus cernuus*), bur-reed (*Sparaganium* spp.), arrowroot (*Thalia geniculata*), cattail/reedmace/bulrush (*Typha* spp.), wild rice (*Zizania aquatica*), and southern wild rice (*Zizaniopsis milacea*), the common reed being preferred due to its widespread availability.

When using the term wetland herein, a sector on the ground is intended, at least partially separated from surroundings, characterized by higher water content and the presence of hygrophilous plants, or other types of plants. In a preferred embodiment of the invention, a constructed wetland unit is sunk in the ground and separated from the surrounding soil by being contained in an impermeable plastic container, such as polypropylene, and comprises hygrophilous or other type of plants that grow above the upper edge of the container. Substrates for the wetland units may be selected according to the plants to be employed, and they are usually selected from natural, and relatively inexpensive granular materials. Since the wetland unit is separated in plastic containers from the surrounding soil, it can be easily removed and replaced if needed for any reason.

Preferably, graywater is immediately treated by contacting the wetland, without cumulating and storing, and processing in bulk; this differs from prior art techniques which store graywater before handling.

Graywater from the house is collected and brought onto the surface of the substrate through which water seeps and becomes purified. When using the term "collecting" for graywater, intended is the act of bringing the graywater from inside the house onto the surface of the wetland, and not its storing or cumulation. The surface of the substrate may be provided with a flow damper, such as a perforated board or a screen or a heavy net; alternatively, any stream brought onto the substrate surface is introduced by means of a stream distributor, such as, a shower-like ending, so that the stream does not move the granular substrate. Under usual household situations, not more than hundreds of liters inflow per hour, and probably not more than tens of liters per hour. This amount of graywater can be absorbed easily by each of the two wetland units.

Figure 1:
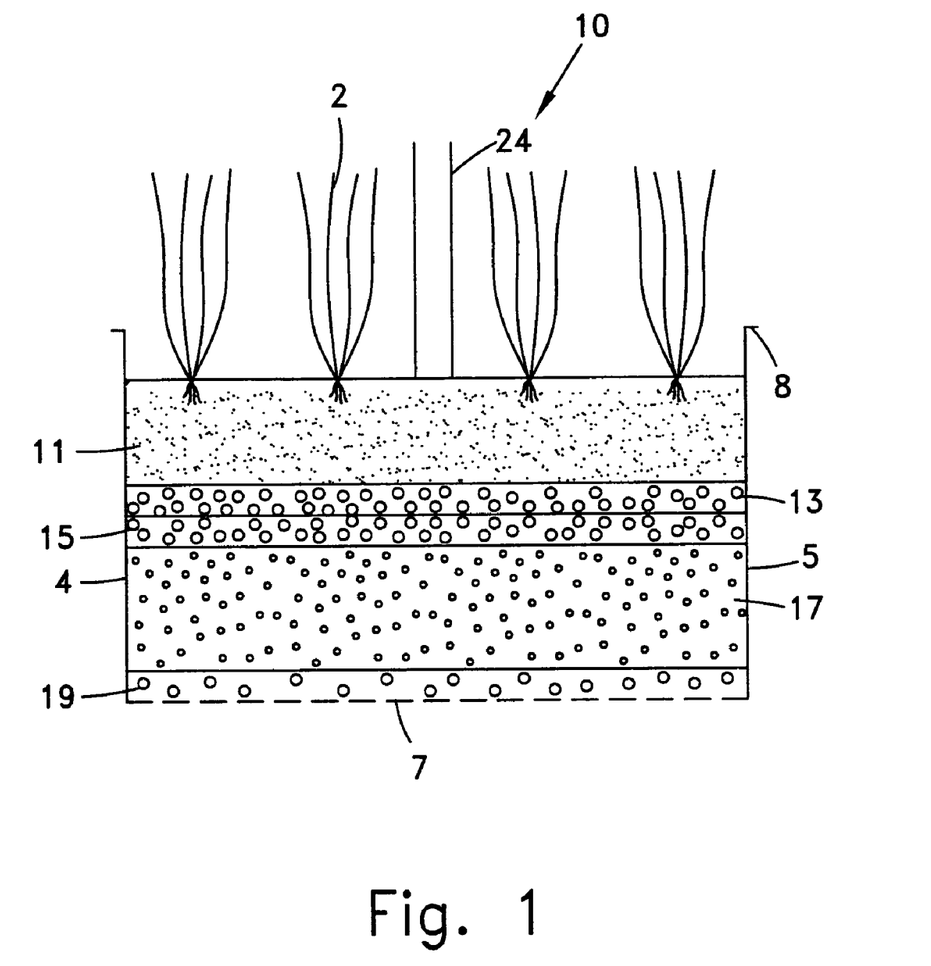
FIG. 1 is a vertical cross sectional view of a constructed wetland unit, according to one embodiment of the invention.

A schematic vertical cross section of an exemplary constructed wetland unit 10 according to one embodiment of the present invention is illustrated in FIG. 1. Granular material is filled in a container having closed side walls 4 and 5, a perforated bottom surface 7, and an open top 8, to allow the growing plants 2 to extend thereabove.

Constructed wetland unit 10 comprises the following layers from top to bottom: (i) an upper layer 11 having a thickness of 15 cm and spaced 10 cm from top 8, comprising a mixture of peat, sand and soil, (ii) a crude tuff layer 13 having a thickness of 5 cm, the tuff having an average grain size of 5 cm; (iii) a fine tuff layer 15 having a thickness of 5 cm, the tuff having an average grain size of 4-8 mm; (iv) a tuff layer 17 having a thickness of 20 cm, the tuff having an average grain size of 1-2 cm; and (v) a crude tuff layer 19 having a thickness of 5 cm, the tuff having an average grain size of 5 cm. The total thickness of the granular material is 50 cm. The applicant has discovered empirically that this layer arrangement provides improved hydrodynamic capabilities. For example, fine tuff layer 15 provides improved filtering characteristics.

While prior art constructed wetlands receive graywater into the root zone by means of perforated pipes and suffer a high risk of system inoperability over extended periods as a result of the elongation of the roots and the blockage of the perforations by the elongated roots, constructed wetland unit 10 of the present invention is provided with a pipe 24 through which the raw graywater flows that is placed on top of, and preferably in abutting relation with, upper layer 11, to ensure discharge onto the wetland, as raw graywater is discharged from the house.

Figure 2:
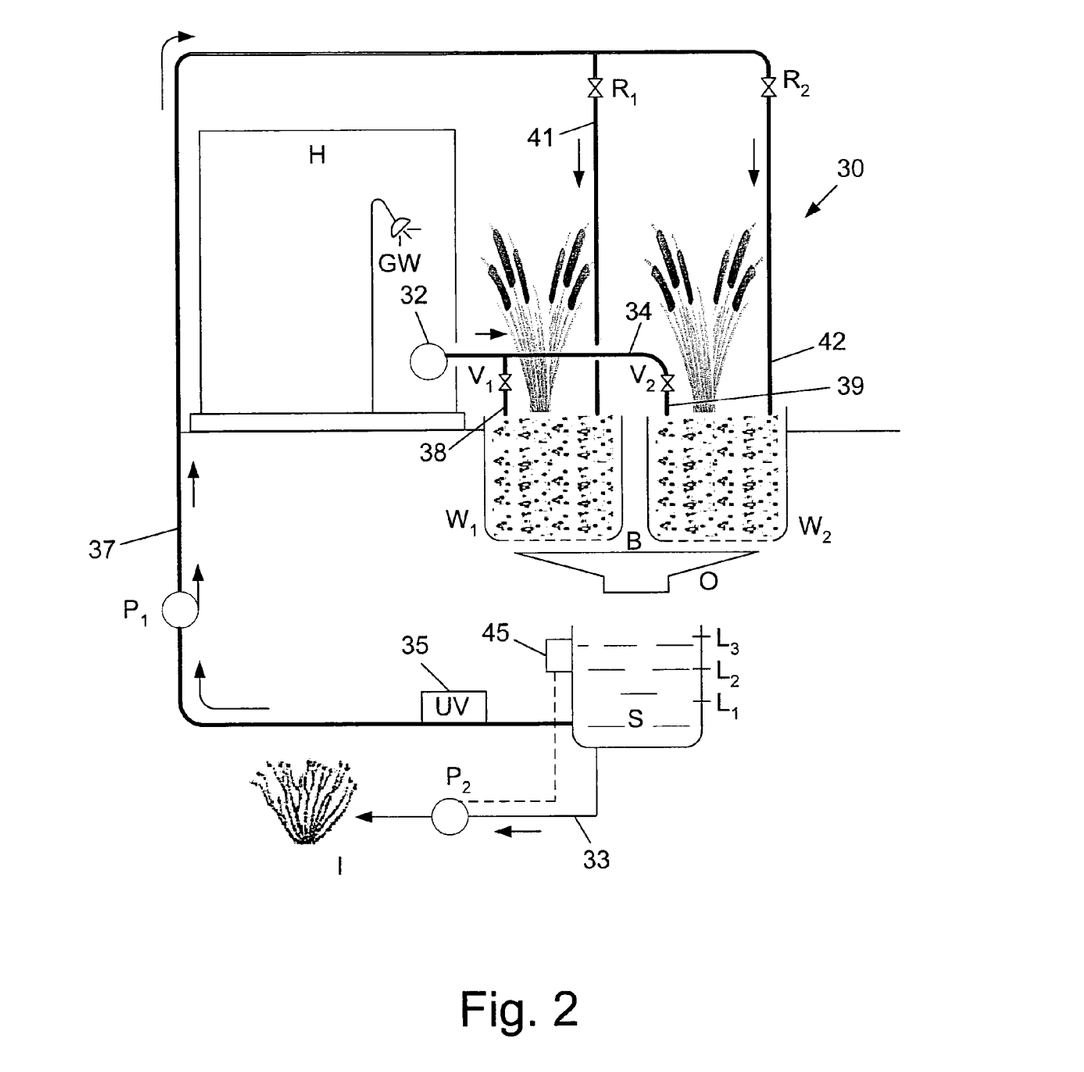
FIG. 2 is a schematic illustration of a system for recycling graywater, according to one embodiment of the invention.

A system 30 for recycling graywater according to one embodiment of the present invention is illustrated in FIG. 2. System 30 comprises two wetland units $W_1$ and $W_2$ in the form of plastic containers, e.g. cube or box shaped, sunk in the garden at the ground level and filled with granular substrates to hold hygrophilous plants, and a sink S, which may be a container covered by plastic mosquito netting, placed under the wetland units. Each wetland unit may be comprised of a hard polypropylene cube or rectangular shaped vessel, e.g. having an edge of 0.7-1 m, with an open top. Alternatively, the bottom B of the wetland units may be provided with one or more outlets O, the outlets possibly having the shape of large funnels. The bottom B may be perforated, e.g. with hundreds of perforations. The one or more outlets O may be connected to any suitable means by which the purified graywater is delivered to sink S, such as pipes, pipe connectors, tubing, funnels, and outlets.

Raw graywater GW from house H is delivered from port 32 to feed line 34, through which the graywater flows to one of the wetland units $W_1$ and $W_2$, as will be described hereinafter. A conduit for receiving the graywater may extend from each graywater source to port 32, such as by means of a conduit network. A typical graywater source is a drain, such as a bathtub or shower drain, a laundry machine drain or a kitchen sink drain, so as to considerably increase the amount of graywater that is available for recycling. After the raw graywater is introduced to a selected wetland unit and seeps through its substrates while undergoing nitrification and biodegradation, and then aeration while falling through the open space between the selected wetland unit and sink S, the purified graywater is collected in sink S. A constantly operating pump $P_1$ delivers the purified graywater via recirculation line 37 from sink S to the selected wetland unit to further purify the graywater. The graywater becomes increasingly purified with each passage through the substrate of the selected wetland. By continuously recirculating the purified graywater vertically through the wetland, a high graywater purification level can be achieved with a wetland unit having a relatively small surface area.

A recirculation ultraviolet-type (UV) disinfection unit 35 for further treating the purified graywater by means of UV-irradiation, thereby preventing the formation of unpleasant odors and eliminating or drastically reducing the number of pathogenic organisms, may be operatively associated with line 37 between sink S and pump $P_1$.

System 30 advantageously provides means for regenerating a wetland unit. While prior art vertical flow constructed wetland units cease to be functional after a relatively short period of time due to the generation of slime and sludge, the constructed wetland units of the present invention are able to function for long periods of time and to help in dramatically reducing the household water consumption.

A wetland unit is regenerated by being maintained in an inactive state for a predetermined period of time, whereby influx of raw graywater and recirculated purified graywater thereto is prevented. Thus the slime and sludge will dry and be eliminated by processes within the wetland, while the wetland unit is in an inactive state, so that the inactive wetland unit will be able to purify raw graywater upon resumption to an active state after the predetermined period of time has elapsed. This predetermined period of time is not necessarily absolute, and the required period of time that leads to the regeneration of a wetland unit is dependent on various factors, including ambient temperature, relative humidity of the surrounding air, and number of hours during the daytime that the wetland units are exposed to direct sunlight. The applicant has concluded empirically for an arid region of Israel that the predetermined period of time is a week during the hot and sunny summer months and two weeks during a rainy period.

One means for regenerating a wetland unit comprises a plurality of valves $V_1$, $V_2$, $R_1$, and $R_2$, for controlling the flow of raw graywater and recirculating purified graywater to wetland unit $W_1$ or $W_2$. The valves associated with a given wetland unit are set in a closed state for the predetermined period of time, to ensure that the wetland unit will remain in the inactive state and be regenerated.

Valves $V_1$ and $V_2$ are operatively associated with feed line 34 so that when valve $V_1$, which may be operatively associated with line 38 branching from feed line 34 and extending to wetland unit $W_1$, is in an opened state and valve $V_2$, which may be operatively associated with line 39 branching from feed line 34 and extending to wetland unit $W_2$, is in a closed state, the raw graywater will flow from port 32 to wetland unit $W_1$, and when valve $V_2$, is in an opened state and valve $V_1$ is in a closed state, the raw graywater will flow from port 32 to wetland unit $W_2$. Valves $R_1$ and $R_2$ are operatively associated with recirculation line 37 so that when valve $R_1$, which may be operatively associated with line 41 branching from recirculation line 37 and extending to wetland unit $W_1$, is in an opened state and valve $R_2$, which may be operatively associated with line 42 branching from recirculation line 37 and extending to wetland unit $W_2$, is in a closed state, the purified graywater will flow from sink S to wetland unit $W_1$, and when valve $R_2$, is in an opened state and valve $R_1$ is in a closed state, the purified graywater will flow from sink S to wetland unit $W_2$.

Valves $V_1$, $V_2$, $R_1$, and $R_2$ may be manually actuated, or alternatively, may be electrically actuated such as by means of a controller. When electrically actuated, valves $V_1$, $V_2$, $R_1$, and $R_2$ may be electrically connected in such a way that when valves $V_1$ and $R_1$ open, valves $V_2$, and $R_2$ close, and vice versa. The controller may be programmed to initiate a switching operation of a valve from an opened state to a closed state, or from a closed state to an opened state, after the predetermined period of time has elapsed.

It will be appreciated that any other number or configuration of valves for controlling the flow of graywater is suitable.

Figure 3:
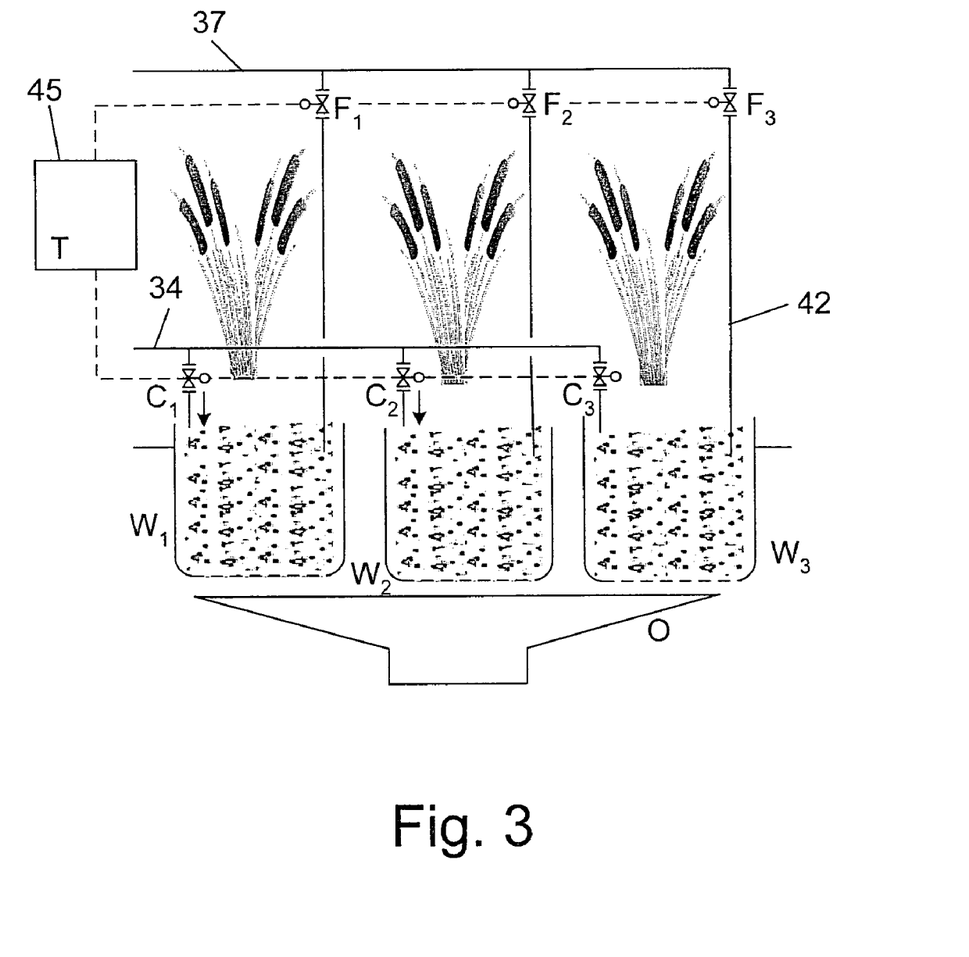
FIG. 3 is a schematic illustration of a control system for regenerating a constructed wetland unit.

For example, as shown in FIG. 3, when three wetland units $W_1$, $W_2$ and $W_3$ are employed, three control valves $C_1$, $C_2$ and $C_3$, respectively, operatively associated with feed line 34 and three control valves $F_1$, $F_2$ and $F_3$, respectively, operatively associated with recirculation line 37 may be employed to control the flow of graywater to the wetland units. Controller 45 is in communication with each of the three pairs of control valves such that the line valve and the recirculation valve of each pair is set at the same state, i.e. whether opened or closed. Other duty cycles are also in the scope of the present invention. For example, a control valve may be set at an intermediate state, i.e. not opened or not closed, in order to regulate the flow of graywater admitted to a corresponding wetland unit.

Controller 45 monitors the inactivity duration of each wetland unit, and commands to open the corresponding control valves after the predetermined period of time has elapsed. Controller 45 may also monitor the activity duration of each wetland unit since an empirically determined maximum duration of being active is indicative of the inability of a wetland unit to purify graywater. In order to optimize the amount of graywater to be recycled, controller 45 may govern the duty cycle of the control valves such that two of the wetland units will always be in the active state and one will be in the inactive state. Thus controller 45 determines which wetland unit has to be set to an inactive state and which wetland units have to be set to an active state at any given period, and commands the corresponding valves to be actuated accordingly.

In the illustrated example of FIG. 3, controller 45 has set valves $C_1$ and $F_1$ associated with wetland unit $W_1$ and valves $C_2$ and $F_2$ associated with wetland unit $W_2$ to the opened state, and has set valves $C_3$ and $F_3$ associated with wetland unit $W_3$ to the closed state. After predetermined period of time T will elapse, valves $C_2$ and $F_2$ will be set to the closed state and valves $C_3$ and $F_3$ will be set to the opened state. After an additional predetermined period of time T will elapse, valves $C_2$ and $F_2$ will be set to the opened state and valves $C_1$ and $F_1$ will be set to the closed state.

It will be appreciated that any other duty cycle can be employed, such as one wherein the valves associated with one wetland unit are not switched from one state to another as soon as the state of the valves associated with another wetland unit are switched.

Referring back to FIG. 2, system 30 may perform water level control, for discharging purified graywater to a garden I when the height of purified graywater in sink S is greater than a predetermined threshold. Level sensors $L_1$, $L_2$ and $L_3$ in communication with controller 45 are mounted on sink S and are adapted to sense the height of the purified graywater within the sink. When the height of purified graywater within sink S rises to $L_3$, controller 45 commands irrigation pump $P_2$ to be activated, so that the purified graywater will be discharged to garden I via line 33, in addition to being recirculated by means of pump $P_1$ via line 37. When the purified graywater height drops to $L_2$, controller 45 commands irrigation pump $P_2$ to be deactivated. It will be appreciated that purified graywater can be manually discharged from the sink to the garden, such as by a spray nozzle and a hose, without use of the water level control.

Figure 4:
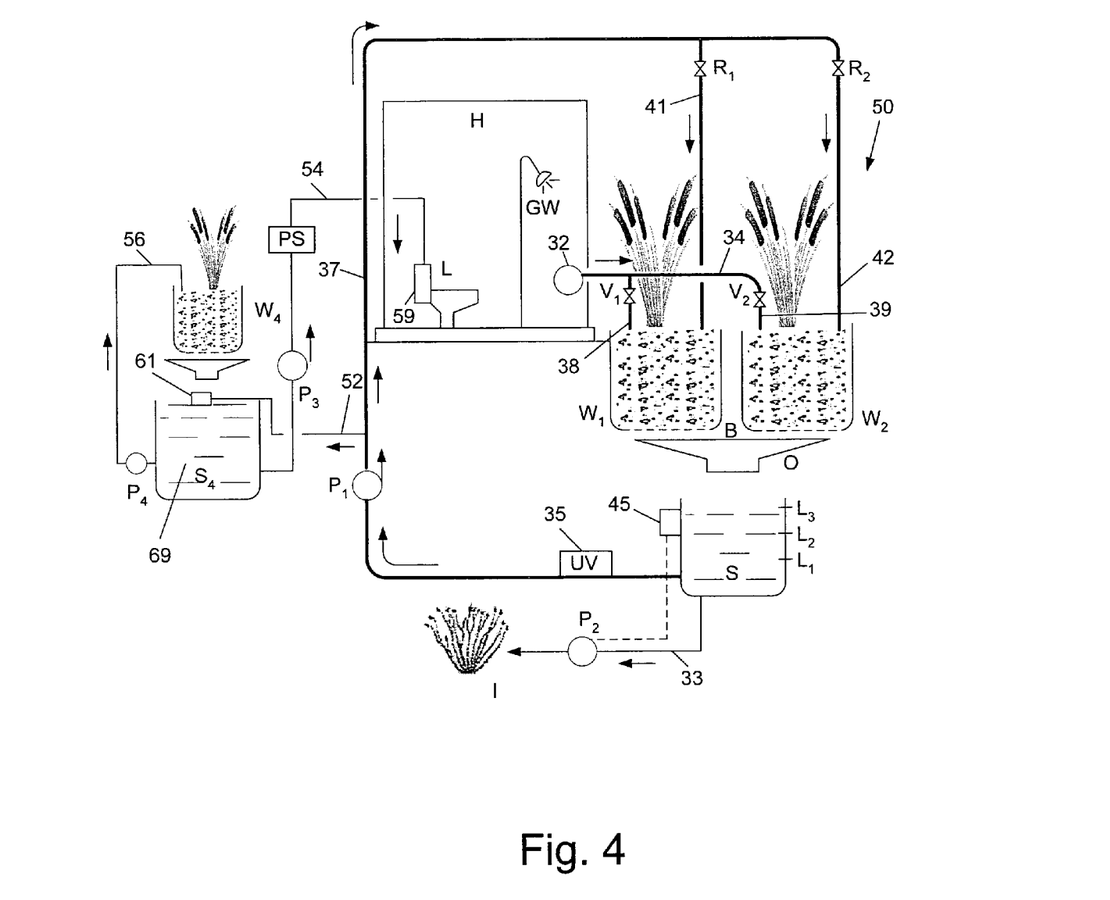
FIG. 4 is a schematic illustration of a system for recycling graywater, according to another embodiment of the invention.

Recirculation pumps $P_1$ and $P_4$, preferably have a low power consumption, so that system 30, in addition to providing significant water savings relative to a prior art system also advantageously reduces electrical power consumption. For example, pumps may be a modified 38 W aquarium filter type pump. The power consumption may be further reduced if the pumps are also powered by photovoltaic cells. Pumps $P_2$ and $P_3$ are high pressure power pumps, but consume only a little electrical power, as they operate for only a short period of time.

The water-loving plants fill the granular substrate in the wetland units with their roots, and so provide a rich medium for myriads of microorganisms that grow on them, all the organisms together then decompose components of graywater and remove contaminants. Thus recycled water can be used for irrigation purposes, while reducing water consumption without any negative repercussions to the environment.

Irrigation water may therefore be provided for maintaining greenery around the house even in areas or during periods of strict water saving regimen. The invention contributes to a high standard of residence planning. The invention, thus, contributes to fresh water conservation and to a reduction in the volume of discharged sewage, and importantly it helps to maintain high aesthetic standards in residence planning. In contrast to known graywater processing methods, the method of the invention does not rely on toxic or dangerous chemicals or materials, and it does not adversely affect the surrounding environment itself or utilize means that would adversely affect the environment. Beside the environmental aspects, the reuse of graywater leads to significant water-bill savings to the family, especially to a family with many children, or to other family members. When the system and method of the present invention are employed, up to 95% of the water that is consumed can be reused, thereby significantly decreasing water bills and saving large amounts of fresh water.

FIG. 4 illustrates another embodiment of the invention wherein the purified graywater is used for flushing toilets, thereby considerably reducing consumption of potable water which would be consumed if the graywater would not have been recycled for such purposes.

System 50 comprises all of the components described hereinabove with respect to system 30 of FIG. 2, and in addition comprises a supplementary wetland unit $W_4$, which may be considerably smaller, e.g. one-tenth the size of wetland units $W_1$ and $W_2$. The purified graywater is delivered to sink $S_4$ of supplementary wetland unit $W_4$ via line 52, which branches from recirculation line 37 and downstream to pump $P_1$. Line 52 is connected to a mechanical float valve 61, which floats on the upper surface of the graywater 69 in supplementary sink $S_4$, and allows for continuous filling of sink $S_4$ without graywater spilling over and out of sink $S_4$. Purified graywater is delivered by means of pump $P_3$ from supplementary sink $S_4$ to tank 59 of lavatory L via line 54 as needed. Graywater 69 is additionally purified by repeated passage through supplementary wetland unit $W_4$. Recirculation pump $P_4$ continuously delivers purified graywater to supplementary wetland unit $W_4$ via line 56 from sink $S_4$. A pressure sensor valve PS is installed within line 54 and is in communication with pump $P_3$. Pump $P_3$ is therefore activated by means of water pressure control when lavatory L is flushed and is deactivated when tank 59 of lavatory L is refilled after flushing. Tank 59 may be a conventional lavatory tank provided with a mechanical float valve.

In an important aspect of the invention, the entire garden I itself may act as one or more wetland units for additionally purifying the irrigation graywater. This is achieved by use of isolated additional wetland units comprised of the garden itself, to prevent ecological damage resulting from the use of graywater. Other advantages of employing isolated wetland units include improved purification capabilities, increased irrigation efficiency, as no water is lost to areas outside the garden, and compliance with local or state regulations regarding graywater usage.

It will be appreciated however, that the invention can be employed to irrigate a regular non-isolated garden as well.

Of course, when taking into consideration an estimated or known amount of household water consumption of a certain family, the system for graywater handling in that house may be planned in better detail. Furthermore, when planning a group of new houses, dedicated precise and inexpensive components may be integrated in the house. The location of the wetland units and of an isolated area of the garden according to the invention are advantageously planned prior to building the house and planting the garden. The wetland units may be constructed with concrete, with stable plastics, or with specialized plastic insulation sheets. Since the entire garden may be isolated, according to the construction conditions, from the surrounding terrain, the total garden area and volume capable of being additional wetland units, may be known and incorporated into the global water planning calculations.

The method and system for reclamation and purification of household graywater of the invention responds to the main demands of contemporary technologies, namely demands for reliability, efficiency, sustainability, and environmental safety, as well as regulatory authority demands and requirements. The present system enables reuse of household wastewater, substantially reducing fresh water consumption, while complying with health and environment safety requirements, and while increasing standard of living including aesthetic standards of house and garden planning.

The present system can be simply and inexpensively provided on a mass scale to family houses, essentially without laying further burden on complex production or energy consumption. The present system can be easily combined with other green technologies and techniques. The system, while avoiding the use of harmful or risky materials, may increase its efficacy by employing other purification means; for example, the UV radiation of sunlight may be employed for treating the graywater, such as prior to being introduced to the granular substrate of a selected wetland unit, wherein the irradiating process may be assisted by a suitable shaping of a flow damper. Solar energy can be further harnessed for driving the pumps, UV disinfection unit, or control valves, using photovoltaic cells. Water losses in the system, due to evaporation from wetland plants, can be lowered by covering parts of the wetland or garden with greenhouse foils, in order to collect and reuse water evaporated from wetland plants via condensation. The family house and garden, when provided with the present system, become a comfortable and aesthetic living unit, as autonomous and as economic as possible, without burdening the environment.

The invention will be further described and illustrated in the following example.

Example

A family house in the Judean desert (central Israel) was provided with the system for graywater reclamation and purification according to the invention. Four cubic rigid plastic vessels of about 600 liters each and without a lid served as two wetland units and as a sink. Two connected vessels serving as a sink were placed in the garden about three meters below the level of the family house; the opened upper face of the cubic vessels were covered by a plastic mosquito net. The sink was provided with an outlet for a pipe through which recirculating water was pumped from its bottom, and an additional outlet for a pipe through which water was pumped to irrigate garden.

The third vessel, serving as the first wetland unit, was placed on top of one of the sink vessels. The bottom of the third vessel was perforated by hundreds of holes, each of which having a diameter of about 1 cm, enabling water to drip into the sink through the net. The fourth vessel, serving as the second wetland unit, was placed on top of the second sink vessel. The bottom of the fourth vessel was also perforated by hundreds of holes of about one centimeter in diameter, enabling water to drip into the sink through the net. The upper parts of both wetland units were situated slightly lower than the ground level of the garden. Both wetland vessels were filled first with a layer of about 5 cm of crude tuff (average size about 5 cm), then with about 20 cm-layer of finer tuff (size 1-2 cm), followed by a 5-cm layer of fine tuff (grain size of about 4-8 mm), and again with a crude tuff layer of about 5 cm. The upper layer, about 15 cm, was formed by a fine mixture of peat, sand and soil. The substrate had the total volume of about 500 liters in each wetland vessel. Common reed was planted in the substrate of both wetlands. Water from the kitchen sinks, washing machine, dish washing machine, and from the bathroom showers, bathtubs and sinks was delivered from the house via a graywater feed line to the surface of the first wetland unit, through which it seeped down to the bottom and was collected in the sink. The second wetland unit was isolated from the feed line. The purified graywater was recirculated to the first wetland unit by means of a continuously operating pump via a recirculation line. The second wetland unit was isolated from the recirculation line. After a period of one week during the summer months and two weeks during the winter months, the first wetland unit was isolated from the feed and recirculation lines and the second wetland unit was connected to the two lines.

The recirculation pump continuously operated day and night, at a flowrate of about 120 liter/hr, even if no purified water was consumed and no raw graywater was produced, so that the graywater was repeatedly recycled, being further purified. Purified graywater discharged from the pump passed through a UV disinfection unit, Atmans 36 W U.V. lamp. A high pressure power pump controlled by water-level controller drew purified graywater from the sink and downstream from the pump to a garden, and then the purified graywater was distributed to trees, shrubs, bushes, flowers and lawns. Additional purified graywater was delivered from the recirculation line to a supplementary wetland unit and supplementary sink, from which it was discharged as needed to a toilet tank. The system has been working in a stable way for over one year in a household of seven to nine people, providing all of the water required for flushing the toilets and for watering the garden of about 250 m$^2$.

While this invention has been described in terms of some specific examples, many modifications and variations are possible. It is therefore understood that within the scope of the appended claims, the invention may be realized otherwise than as specifically described.

I claim:

1. A system for processing and repeatedly recycling graywater for reuse in a domestic site, comprising:
   a) a source of graywater;
   b) at least two vertical flow wetland units, each of said at least two vertical flow wetland units comprising a container filled with at least one granular substrate and at least one species of a hygrophilous plant, and an outlet means;
   c) a first conduit means extending from said graywater source to a location on top of an uppermost layer of each of said at least two wetland units, for delivering the graywater to said at least two wetland units without risk of first conduit blockage caused by elongated roots;
   d) a sink for receiving purified graywater discharged from the outlet means of each of said at least two wetland units;
   e) a second conduit means extending from said sink to each of said at least two wetland units;
   f) a recirculation pump for delivering purified graywater through said second conduit means;
   g) an isolating means, for isolating a first wetland unit from said first and second conduit means while allowing the graywater and purified graywater to be introduced into a second wetland unit after flowing through said first and second conduit means, respectively, and for subsequently isolating said second wetland unit from said first and second conduit means after a predetermined period of time while allowing the graywater and purified graywater to be introduced into a selected active wetland unit after flowing through said first and second conduit means;
   h) a means for controlling an activity duration of said selected wetland unit;
   i) an interface unit for discharging the purified graywater from said sink to a garden for reuse;
   j) a supplementary wetland unit;
   k) a supplementary sink for receiving purified graywater from said supplementary wetland unit and from a diverting line extending from said second conduit means and downstream from said recirculation pump;
   l) an additional line extending from said supplementary sink to said supplementary wetland unit;
   m) an additional pump for delivering purified graywater from said supplementary sink to said supplementary wetland unit via said additional line;
   n) a discharge line extending from said supplementary sink to a toilet tank, through which additionally purified graywater flows; and
   o) a discharge pump operatively associated with said discharge line for delivering said additionally purified graywater to said toilet tank for reuse.

2. The system according to claim 1, wherein the interface unit comprises a hose and nozzle for manually discharging the purified graywater to the garden.

3. The system according to claim 1, wherein the interface unit comprises an irrigation pump for automatically discharging the purified graywater to the garden when the height of purified graywater in the sink is greater than a predetermined threshold.

4. The system according to claim 1, wherein the outlet means comprises a perforated bottom of a wetland unit, from which purified graywater drips from a wetland unit to the sink.

5. The system according to claim 1, further comprising an entire garden, or portions of an entire garden, when isolated from the surroundings, serving as one or more additional wetland units.

6. The system according to claim 1, wherein the volume of each wetland unit is about 600 liters.

7. The system according to claim 6, wherein the at least one granular substrate has a total volume of about 500 liters and has a total thickness of about 50 cm.

8. The system according to claim 1, further comprising an ultraviolet-type disinfection unit operatively associated with the second conduit means between the sink and the recirculation pump for further treating the purified graywater.

9. The system according to claim 1, wherein the supplementary wetland unit is considerably smaller than each of the at least two vertical flow wetland units.

10. The system according to claim 1, wherein a pressure sensor in communication with the discharge pump is installed in the discharge line, the discharge pump being activated after a toilet associated with the toilet tank is flushed and being deactivated when the toilet tank is refilled.

11. A method for processing and repeatedly recycling graywater for reuse in a domestic site, comprising the steps of:
 a) providing at least two vertical flow wetland units, each of said at least two vertical flow wetland units comprising a container filled with at least one granular substrate and at least one species of a hygrophilous plant, and an outlet means;
 b) setting at least one of said wetland units to an inactive state during a predetermined period of time such that influx of graywater to each of said inactive units is prevented, whereby to regenerate each of said inactive wetland units;
 c) setting at least one of said wetland units to an active state, whereby graywater introduced to each of said active wetland units is purified;
 d) delivering graywater from a source of graywater to each of said active wetland units while purified graywater is discharged from the corresponding outlet means to a sink;
 e) repeatedly recirculating at least a portion of said purified graywater to each of said active wetland units;
 f) discharging a portion of said purified graywater from said sink to a garden for reuse;
 g) diverting a portion of said purified graywater to a supplementary sink;
 h) repeatedly recirculating purified graywater from said supplementary sink to a supplementary wetland unit while the purified graywater is discharged to said supplementary sink, whereby to additionally purify the graywater; and
 i) delivering said additionally purified graywater to a toilet tank for reuse.

12. The method according to claim 11, further comprising the steps of switching the state of at least one of the inactive wetland units to an active state following the predetermined period of time and repeating steps d-h.

13. The method according to claim 11, further comprising the steps of switching the state of at least one of the active wetland units to an inactive state during the predetermined period of time and repeating steps d-h.

14. The method according to claim 11, wherein the step of setting at least one of said wetland unit to an inactive state is performed by isolating a selected wetland unit from a first conduit means extending from the graywater source to each of the wetland units and from a second conduit means extending from the sink to each of the wetland units.

15. The method according to claim 14, wherein the selected wetland unit is isolated from the first and second conduit means by a controller and control valves in communication with said controller.

16. The method according to claim 15, wherein the controller commands to switch the selected wetland unit from an inactive state to an active state.

* * * * *